US006610112B1

(12) United States Patent
Klock et al.

(10) Patent No.: US 6,610,112 B1
(45) Date of Patent: Aug. 26, 2003

(54) METHOD FOR OIL GASIFICATION

(75) Inventors: Byron Von Klock, Houston, TX (US); Henry C. Chan, Bellaire, TX (US)

(73) Assignee: Texaco Inc., San Ramon, CA (US)

( * ) Notice: Subject to any disclaimer, the term of this patent is extended or adjusted under 35 U.S.C. 154(b) by 0 days.

(21) Appl. No.: 09/455,769

(22) Filed: Dec. 7, 1999

(51) Int. Cl.[7] .................................................. C10J 3/00
(52) U.S. Cl. ...................... 48/214 R; 48/62 R; 48/94; 48/211; 48/212; 48/215; 422/187; 422/188; 422/189; 422/234; 422/235
(58) Field of Search .......................... 48/62 R, 102 R, 48/94, 128, 197 R, 198.5, 211, 212, 215, 214 R; 422/169, 170, 187, 188, 189, 234, 235; 473/418.2, 648.1, 650; 95/163, 174, 247, 266; 96/219; 210/180, 188, 195.1, 196, 335

(56) References Cited

U.S. PATENT DOCUMENTS

| 3,615,297 A | * | 10/1971 | Dille et al. .................... 48/212 |
| 3,620,700 A | * | 11/1971 | Schlinger et al. ............. 48/215 |
| 3,689,586 A | * | 9/1972 | Busch et al. ................. 585/537 |
| 3,975,168 A | * | 8/1976 | Gorbaty .................... 48/197 R |
| 4,141,696 A | | 2/1979 | Marion et al. |
| 4,704,137 A | * | 11/1987 | Richter ...................... 48/197 R |
| 4,786,420 A | * | 11/1988 | Dalessandro ................. 210/252 |
| 4,873,323 A | * | 10/1989 | Cros et al. .................... 536/114 |
| 5,374,356 A | * | 12/1994 | Miller et al. ................. 210/259 |
| 5,415,673 A | * | 5/1995 | Hilton et al. ................ 252/373 |
| 5,571,408 A | * | 11/1996 | Rising ......................... 210/167 |

FOREIGN PATENT DOCUMENTS

| EP | 0648828 | | 4/1995 | |
| GB | 2292097 A | * | 2/1996 | ........... B01D/25/28 |

* cited by examiner

Primary Examiner—Jerry D. Johnson
Assistant Examiner—Basia Ridley
(74) Attorney, Agent, or Firm—Frank C. Turner

(57) ABSTRACT

The present invention relates to a method for oil gasification. In particular, the present invention relates to a method for oil gasification while reducing wastewater and costly purification systems. The method comprises providing feedstock and water to an oil gasification system; receiving flash gas from the oil gasification system at a flash gas condensing section; extracting vapor generated by the flash gas condensing section; returning water produced by the extracting step to the flash gas condensing section; outputting dry flash gas produced by the extracting step; receiving spent wash water at a syngas cooling section from a syngas washing section; and outputting washed syngas from the syngas washing section.

6 Claims, 7 Drawing Sheets

METHOD FOR OIL GASIFICATION

BACKGROUND OF THE INVENTION

1. Field of the Invention

The present invention relates to a system and method for oil gasification. In particular, the present invention relates to a system and method for oil gasification while reducing wastewater and purification systems.

2. Related Art

Gasification is among the cleanest and most efficient technologies for the production of power, chemicals and industrial gases from hydrocarbon feedstocks, such as coal, heavy oil, and petroleum coke. Gasification converts hydrocarbon feedstocks into clean synthesis gas, or syngas, composed primarily of hydrogen ($H_2$) and carbon monoxide (CO). In a gasification plant, the feedstock is mixed with oxygen ($O_2$) and they are injected into a gasifier. Inside the gasifier, the feedstock and the $O_2$ are subjected to a high-temperature and a high-pressure. As a result, the feedstock and the $O_2$ break down into syngas.

In addition to $H_2$ and CO, the syngas contains other gases in small quantities, such as ammonia, methane and hydrogen sulfide ($H_2S$). As much as 99% or more of the $H_2S$ present in the syngas can be recovered and converted to elemental sulfur form and used in the fertilizer or chemical industry. Ash and any metals are removed in a slag-like state, and the syngas is cleansed of particulates. The clean syngas is then used for generating electricity and producing industrial chemicals and gases.

Gasification allows refineries to self-generate power and produce additional products. Thus, gasification offers greater efficiencies, energy savings, and a cleaner environment. For example, a gasification plant at a refinery in El Dorado, Kansas converts petroleum coke and refinery wastes into electricity and steam, making the refinery entirely self-sufficient for its energy needs and significantly reducing waste and coke handling costs. For these reasons, gasification has increasingly become popular among refiners worldwide. Currently, there are several hundred gasification plants in operation worldwide.

As part of the gasification process, some water must be purged due to the high levels of contaminants and inert corrosive salts that could damage the system. The wastewater must be treated to enable it to meet environmental quality standards. The removal of large amounts of wastewater necessitates the addition of a substantial amount of high quality intake water to maintain the system's equilibrium. The process of treating wastewater and adding "new" intake water is extremely costly. Additionally, to remove ammonia from the water within the system, an expensive reflux stripper is typically required. In some systems, even after the removal of the ammonia and a large percentage of contaminants, the purged water still does not meet strict environmental regulations.

For these reasons, a need has been recognized by the inventors for an oil gasification system that does not require expensive water treatment devices and does not require an input of additional water to the system while still meeting strict environmental standards.

SUMMARY OF THE INVENTION

The present invention solves the problems with, and overcomes the disadvantages of, conventional oil gasification systems.

The present invention relates to a system and method for oil gasification. In particular, the present invention relates to an apparatus and method for oil gasification while reducing wastewater. In one aspect of the present invention, a process configuration for use with an oil gasification system is provided. The processing apparatus comprises a flash gas condensing section, a syngas washing section, and a syngas cooling section. The flash gas condensing section is configured to receive flash gas from the oil gasification system. There is a vacuum pump coupled to the flash gas condensing section which is configured to extract vapor from the flash gas condensing section. The vacuum pump has a water outlet coupled to the flash gas condensing section, and a dry flash gas outlet. The syngas washing section has a wash water inlet, a spent wash water outlet, a cold syngas inlet and a syngas outlet. The syngas cooling section is configured to receive spent wash water from the syngas washing section and to receive seal and flush water from the flash gas condensing section.

In another aspect of the invention, an oil gasification system is provided. The oil gasification system comprises a partial oxidation gasifier configured to receive feedstock and water and to emit hot syngas. There is a syngas quenching and soot scrubbing section coupled to the partial oxidation gasifier and a soot water vacuum flashing section coupled to the syngas quenching and soot scrubbing section. A flash gas condensing section is coupled to the soot water vacuum flashing section. There is a soot filter configured to receive cool soot water from the soot water vacuum flashing section and to output filtrate and a soot filter cake. A syngas washing section is provided which has a wash water inlet, a spent wash water outlet, a cold syngas inlet and a syngas outlet. A syngas cooling section is provided.

In a further aspect of the present invention, a method for performing oil gasification is provided. The method comprises: providing feedstock and water to an oil gasification system; receiving flash gas from the oil gasification system at a flash gas condensing section; extracting vapor generated by the flash gas condensing section; returning water produced by the extracting step to the flash gas condensing section; outputting dry flash gas produced by the extracting step; receiving spent wash water at a syngas cooling section from a syngas washing section; and outputting washed syngas from the syngas washing section.

Accordingly, the present invention provides a system and method for oil gasification that eliminates costly water treatment devices and does not require an input of additional fresh, clean water to the system. The system of the present invention is a substantially closed loop system.

Features and Advantages

The system of the present invention eliminates the need for expensive water treatment devices and processes. For example, the present invention eliminates the need for a high-ammonia purge cold condensate stream, and a large, expensive ammonia stripper, and associated requirements to handle its offgas and provide it with stripping steam, as in conventional systems.

The system of the present invention eliminates the need for a contaminated process water purge stream, and thus eliminates the need for expensive wastewater treatment and any adverse environmental effects of the discharged water.

The system of the present invention does not require a steady input of fresh, clean feed water to operate and thereby reduces intake water consumption.

The system of the present invention eliminates the need for a filter-feed heat exchanger cooler by adding low-cost equipment.

The system of the present invention recycles cold syngas condensate water to the gasifier as moderator water, thereby eliminating the need to add additional water to the system.

The system of the present invention recycles most of the cold syngas condensate back to the upstream stages of syngas cooling.

Additional features and advantages of the invention will be set forth in the description that follows, and in part will be apparent from the description, or may be learned in practice of the invention.

BRIEF DESCRIPTION OF THE DRAWINGS

The accompanying drawings, which are incorporated in and constitute a part of this specification, illustrate embodiments of the invention and, together with the description, serve to explain the features, advantages, and principles of the invention.

DETAILED DESCRIPTION OF THE PREFERRED EMBODIMENTS

Reference will now be made in detail to the present preferred embodiments of the invention, examples of which are illustrated in the accompanying drawings. The exemplary embodiment of this invention is shown in some detail, although it will be apparent to those skilled in the relevant art that some features which are not relevant to the invention may not be shown for the sake of clarity.

Figure 1:
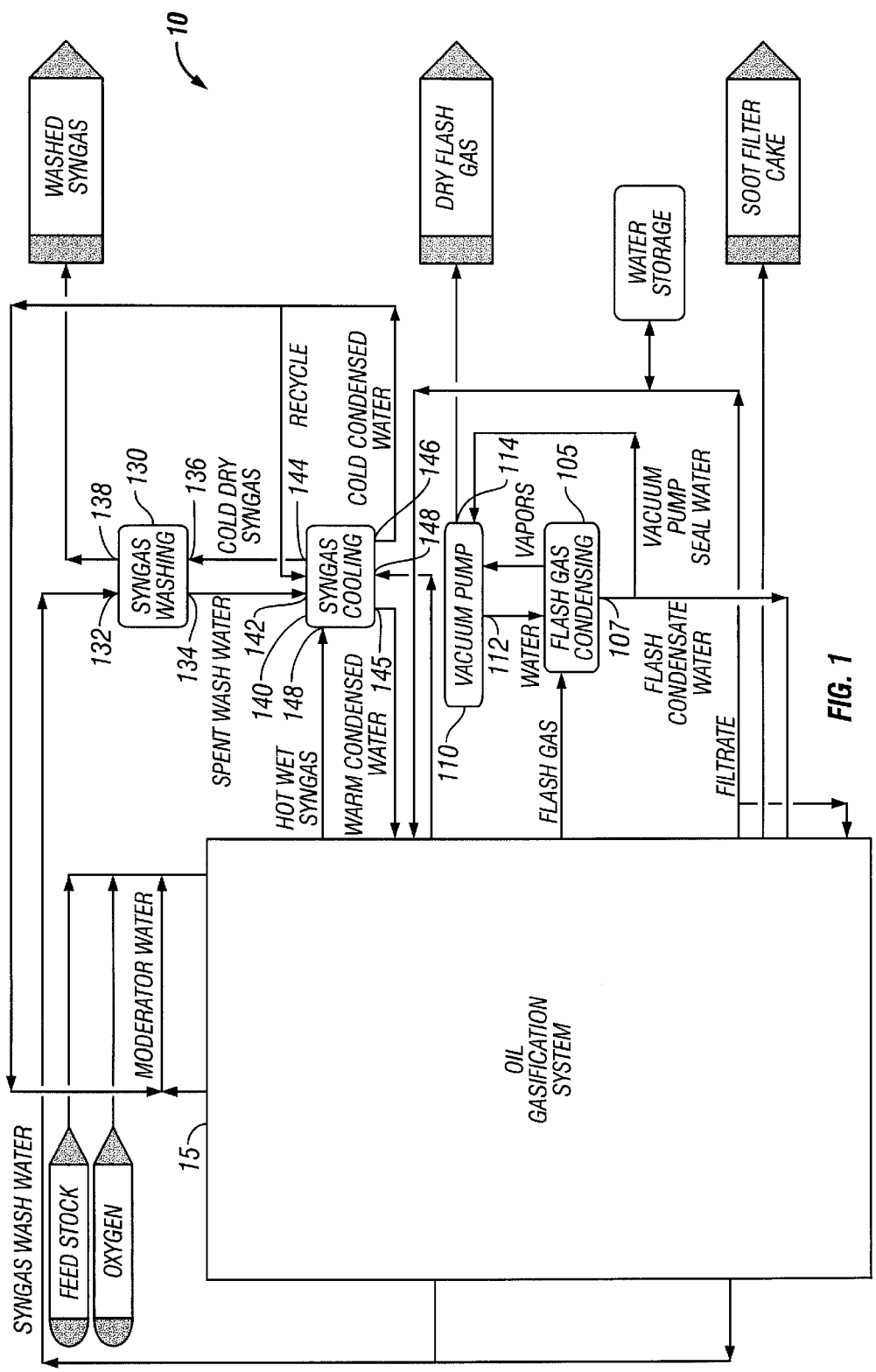
FIG. 1 is a schematic of one embodiment of a processing apparatus of the present invention for use with an oil gasification system.
Figure 2:
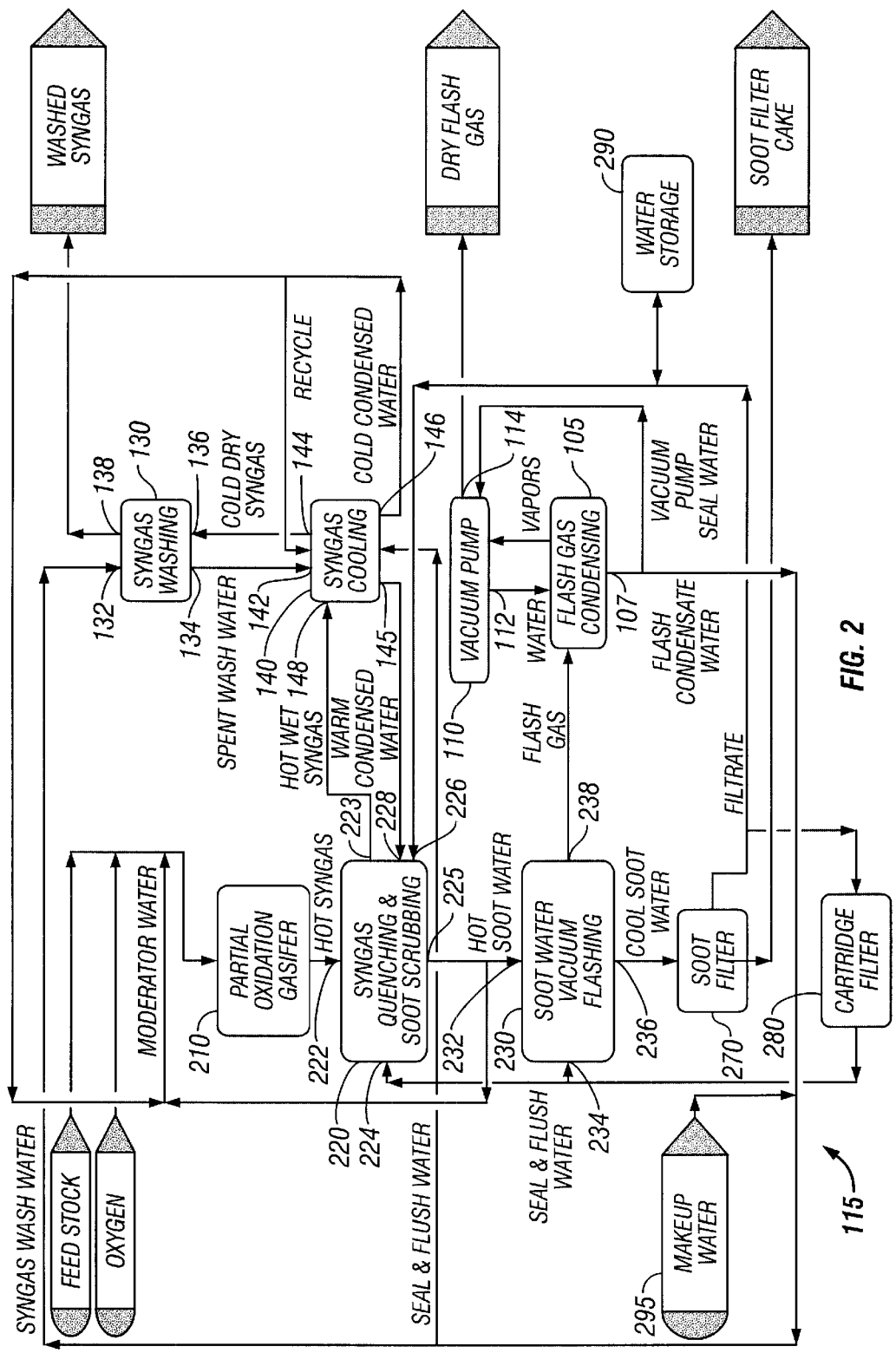
FIG. 2 is a schematic of one embodiment of an oil gasification system of the present invention.

Referring first to FIGS. 1 and 2, there is illustrated an exemplary embodiment of the present invention. FIG. 1 illustrates a processing apparatus 10 of the present invention for use with an oil gasification system 15. An exemplary oil gasification system 15 is illustrated in FIG. 2. The processing apparatus 10 of the present invention is suitable for use with oil gasification systems similar to those shown in FIG. 2.

The processing apparatus 10 of the present invention comprises a flash gas condensing section 105 configured to receive flash gas from the oil gasification system 15. A vacuum pump 110 is coupled to the flash gas condensing section 105. The vacuum pump 110 is configured to extract vapor from the flash gas condensing section 105. The vacuum pump 110 has a water outlet 112 coupled to the flash gas condensing section 105, and a dry flash gas outlet 114. While the vacuum pump 110 may be of any variety known to those of ordinary skill in the art, it is desirable for the vacuum pump 110 to be a liquid ring pump.

The processing apparatus 10 further comprises a syngas washing section 130 having a wash water inlet 132, a spent wash water outlet 134, a cold syngas inlet 136, and a syngas outlet 138. A syngas cooling section 140 is also provided and is configured to receive spent wash water from the syngas washing section 130 and to receive seal and flush water from the flash gas condensing section 105.

The flash gas condensing section 105 comprises a condensate water outlet 107 for providing syngas wash water to the wash water inlet 132 of the syngas washing section 130 and to the syngas cooling section 140 through wash water inlet 142. The condensate water outlet 107 also provides vacuum pump seal water to the vacuum pump 110.

Figure 5:
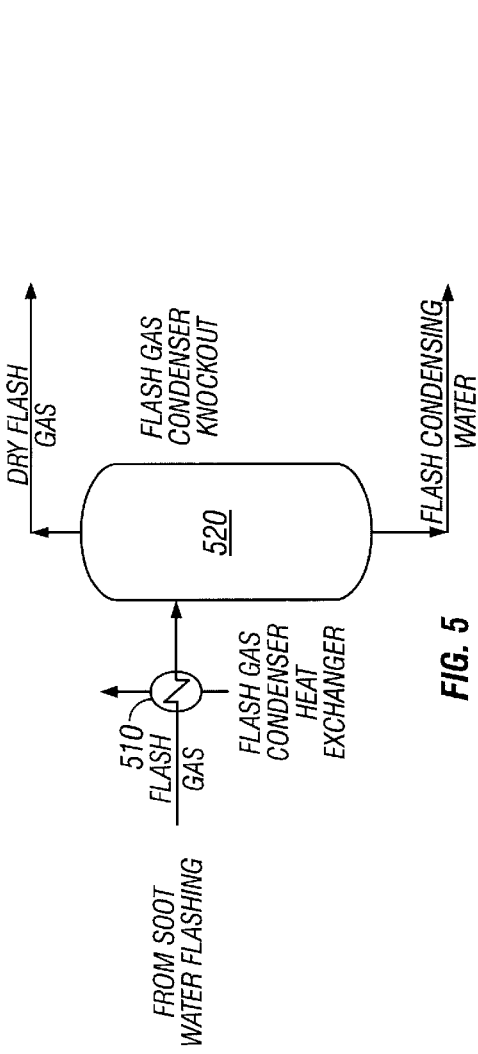
FIG. 5 is a schematic of the flash gas condensing section of the systems shown in FIGS. 1 and 2.

One embodiment of flash gas condensing section 105 is shown in FIG. 5. Flash gas condensing section 105 includes a flash gas condenser heat exchanger 510 and a flash gas condenser knockout drum 520. The water provided from the water outlet 112 of the vacuum pump 110 is returned to the flash gas condenser knockout drum 520.

Figure 3:
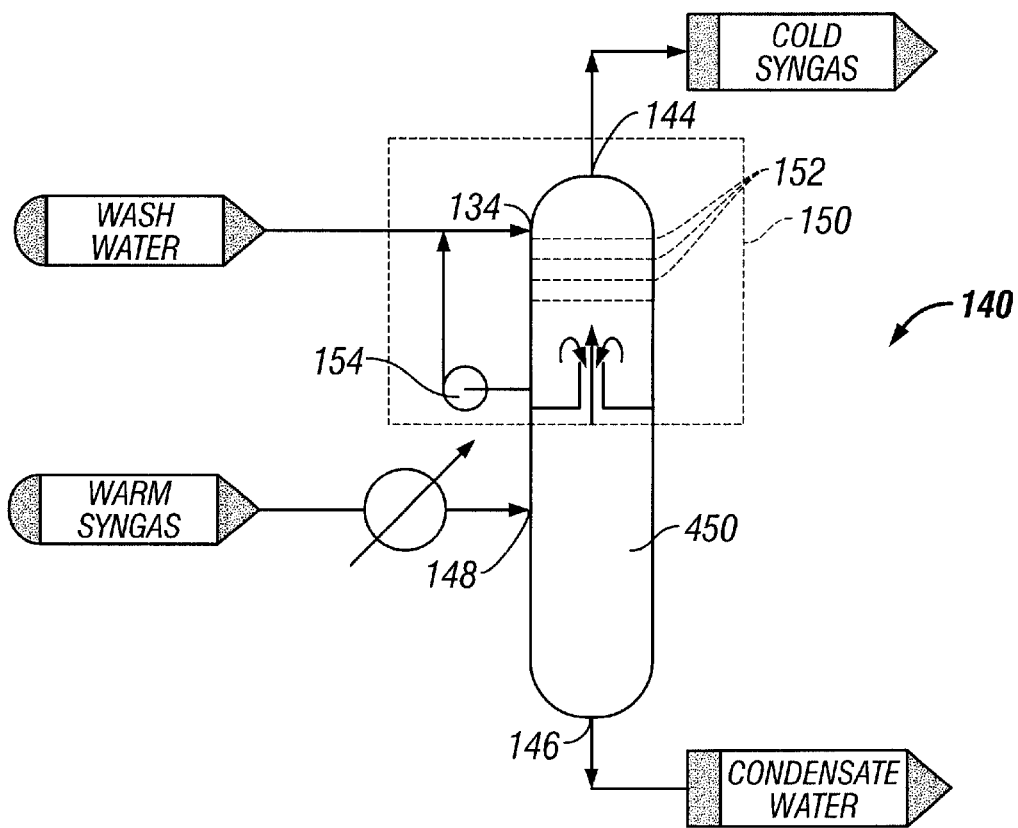
FIG. 3 is a schematic of a component of the systems shown in FIGS. 1 and 2.

The syngas cooling section 140 includes a wash water inlet 142 for receiving spent wash water from the syngas washing section 130; a syngas wash assembly 150 (best seen in FIG. 3); a syngas outlet 144 for emitting cold dry syngas to the syngas washing section 130; a first condensate outlet 145 for emitting warm condensed water to the oil gasification system 15; a second condensate outlet 14 6 for emitting cold condensed water to the oil gasification system 15; and a syngas inlet 148 for receiving hot wet syngas from the oil gasification system 15. As seen in FIG. 3, the syngas wash assembly 150 comprises a plurality of wash trays 152 and a water recirculating pump 154.

Figure 4:
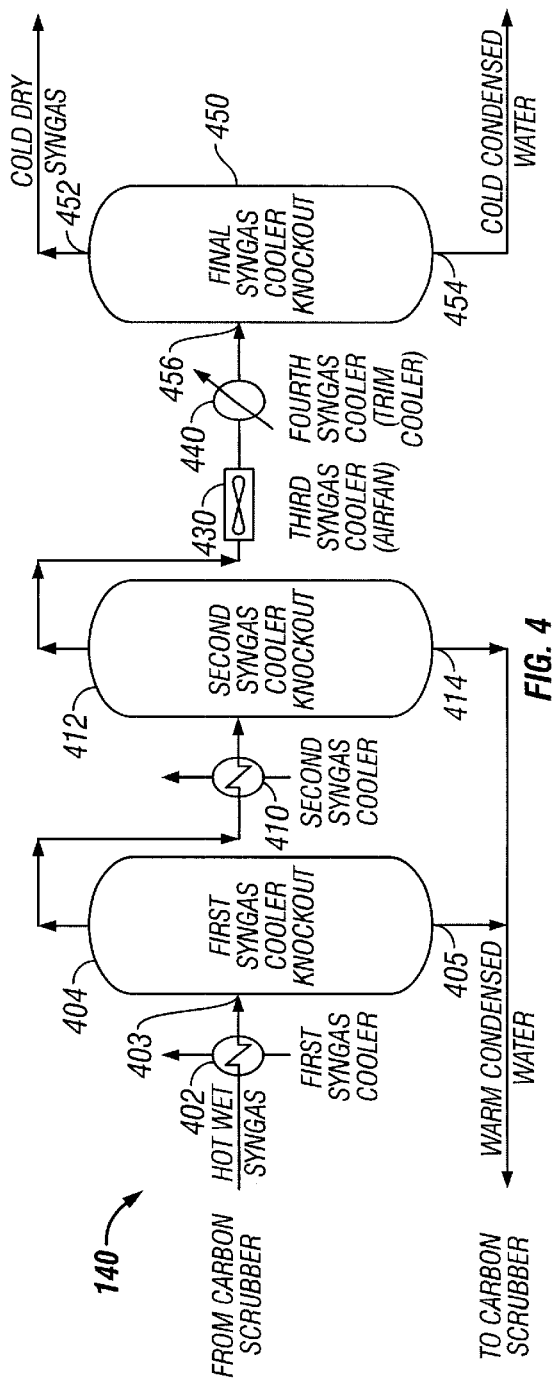
FIG. 4 is a schematic of the syngas cooling section of the systems shown in FIGS. 1 and 2.

Referring now to FIG. 4, one embodiment of the syngas cooling section 140 is provided. The syngas cooling section 140 comprises a first syngas cooler 402 and a first syngas cooler knockout drum 404. The first syngas cooler knockout drum 404 has a syngas inlet 403 for receiving hot wet syngas from the oil gasification system; and a first condensate outlet 405 for emitting warm condensed water to the oil gasification system. A second syngas cooler 410 and a second syngas cooler knockout drum 412 are also provided. The second syngas cooler knockout drum 412 has a second condensate outlet 414 for emitting warm condensed water to the oil gasification system. There is a third syngas cooler 430, which is preferably an airfan, and a fourth syngas cooler 440 which serves as a trim cooler. A third or final syngas cooler knockout drum 450 comprises a syngas outlet 452 for emitting cold dry syngas to the syngas washing section; and a third condensate outlet 454 for emitting cold condensed water to the oil gasification system. There is a wash water inlet 456 for receiving spent wash water from the syngas washing section. Preferably, final syngas cooler knockout drum 450 contains syngas wash assembly 150. In this stage of the system, the feed has been cooled enough that it is suitable for washing as required.

In another aspect of the present invention, as illustrated in FIG. 2, an oil gasification system 115 is provided. The system includes a partial oxidation gasifier 210 configured to receive feedstock, oxygen, and water and to emit hot syngas; a syngas quenching and soot scrubbing section 220 coupled to the partial oxidation gasifier 210; a soot water vacuum flashing section 230 coupled to the syngas quenching and soot scrubbing section 220; flash gas condensing section 105 coupled to the soot water vacuum flashing section 230; a soot filter 270 configured to receive cool soot water from the soot water vacuum flashing section 230 and to output filtrate and a soot filter cake; syngas washing section 130 having wash water inlet 132, spent wash water outlet 134, cold syngas inlet 136 and syngas outlet 138; and syngas cooling section 140.

There is a vacuum pump 110, preferably a liquid ring pump, coupled to the flash gas condensing section 105. A cartridge filter 280 is provided and is configured to receive cool soot water and filtrate from the soot filter 270 and to emit seal and flush water to both the soot water vacuum flashing section 230 and the syngas quenching and soot scrubbing section 220. The cartridge filter 280 is preferably a fine mesh filter.

The syngas quenching and soot scrubbing section 220 includes a hot syngas inlet 222 for receiving hot syngas from the partial oxidation gasifier 210; a water inlet 224 for receiving the seal and flush water from the cartridge filter 280; a filtrate inlet 226 for receiving cool soot water and filtrate from the soot filter 270; a condensed water inlet 228 for receiving warm condensed water from the syngas cooling section 140; a syngas outlet 223 for emitting hot wet syngas to the syngas cooling section 140; and a hot soot water outlet 225 for emitting hot soot water to the soot water vacuum flashing section 230 and to the partial oxidation gasifier 210.

The soot water vacuum flashing section 230 has a hot soot water inlet 232 for receiving the hot soot water from the syngas quenching and soot scrubbing section 220. There is a water inlet 234 for receiving the seal and flush water from the cartridge filter 280; a soot water outlet 236 for emitting the cool soot water to the soot filter 270; and a flash gas outlet 238 for emitting the flash gas to the flash gas condensing section 105.

The flash gas condensing section 105 includes a condensate water outlet 107 for providing the syngas wash water to the wash water inlet 132 of the syngas washing section 130 and to the syngas cooling section 140. It also provides vacuum pump seal water to the vacuum pump 110. The vacuum pump 110 extracts vapors from the flash gas condensing section 105, outputs water to the flash gas condenser knockout drum 520 and also outputs dry flash gas.

The syngas cooling section 140 of the system of the present invention includes wash water inlet 142 for receiving spent wash water from syngas washing section 130; syngas wash assembly 150; syngas outlet 144 for emitting cold dry syngas to the syngas washing section 130; first condensate outlet 145 for emitting warm condensed water to the syngas quenching and soot scrubbing section 220 and second condensate outlet 146 for emitting cold condensed water to the partial oxidation gasifier 210; and syngas inlet 148 for receiving hot wet syngas from the syngas quenching and soot scrubbing section 220.

The embodiment of the syngas cooling section 140 shown in FIG. 4 can be used with the embodiment of the oil gasification system 115 shown in FIG. 2. In such an embodiment, the first syngas cooler knockout drum 404 has a syngas inlet 403 for receiving hot wet syngas from the syngas quenching and soot scrubbing section 220; and a first condensate outlet 405 for emitting warm condensed water to the syngas quenching and soot scrubbing section 220. The second syngas cooler knockout drum 412 has a second condensate outlet 414 for emitting warm condensed water to the syngas quenching and soot scrubbing section 220. Preferably, final syngas cooler knockout drum 450 is configured to contain syngas wash assembly 150, having a syngas outlet 452 for emitting cold dry syngas to the syngas washing section 130; and a third condensate outlet 454 for recycling cold condensed water to the partial oxidation gasifier. There is a wash water inlet 456 for receiving spent wash water from the syngas washing section 130. Preferably, final syngas cooler knockout drum 450 contains syngas wash assembly 150.

The oil gasification system 115 may also include a water storage container 290 for maintaining excess water during cleaning operations. When gasification equipment is taken out of service for maintenance, the water in the process vessels must be drained. To avoid having this be a source of wastewater, the drained water is collected in storage container 290 for later return to the process vessels when they are returned to service. In the event that there is some loss of water in the system, a makeup water supply 295 is provided. However, as noted above, the system is a substantially closed-loop system.

Figure 6:
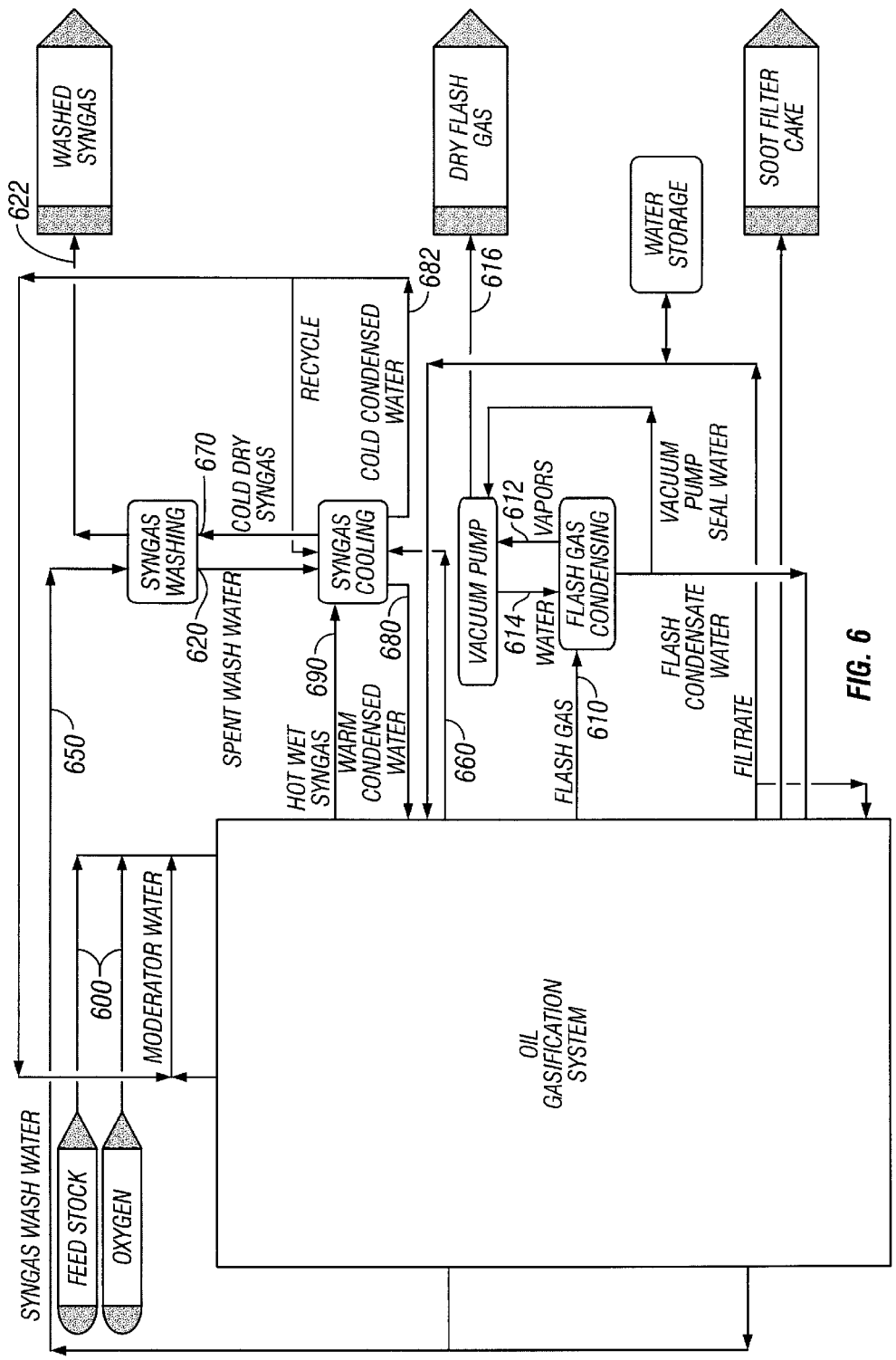
FIG. 6 is a schematic of one embodiment of a method of the present invention.

Referring now to FIG. 6, in another aspect of the present invention, a method for performing oil gasification is provided. The method includes providing section 600 in which feedstock and oxygen are provided to an oil gasification system. The feedstock is typically a hydrocarbon feedstock such as coal, heavy oil and petroleum coke. Water is also initially provided to the system. Flash gas is received from the oil gasification system at a flash gas condensing section 610. Vapor that is generated by the flash gas condensing section 610 is extracted by a vacuum pump in an extracting section 612. In a returning section 614, the vacuum pump returns water produced by the extracting section 612 to the flash gas condensing section 610. Dry flash gas produced by the extracting section 612 is output from the vacuum pump in an outputting section 616. In a receiving section 620, spent wash water is received at a syngas cooling section from a syngas washing section and washed syngas is output from the syngas washing section in outputting section 622.

The method farther includes providing section 650 in which syngas wash water is provided from a condensate water outlet of the flash gas condensing section 610 to a wash water inlet of the syngas washing section. In providing section 660, seal and flush water is provided to the syngas cooling section from the oil gasification system. In a receiving section 644, spent wash water is received from the syngas washing section at a wash water inlet of the syngas cooling section. In an emitting section 670, cold dry syngas is emitted to the syngas washing section from a syngas outlet of the syngas cooling section. Warm condensed water and cold condensed water are emitted to the oil gasification system from a first condensate outlet in emitting section 680, and a second condensate outlet of the syngas cooling section in emitting section 682, respectively. Hot wet syngas is received from the oil gasification system at a syngas inlet of the syngas cooling section in receiving section 690. Preferably, final syngas cooler knockout drum 450 contains a syngas wash assembly 150.

Figure 7:
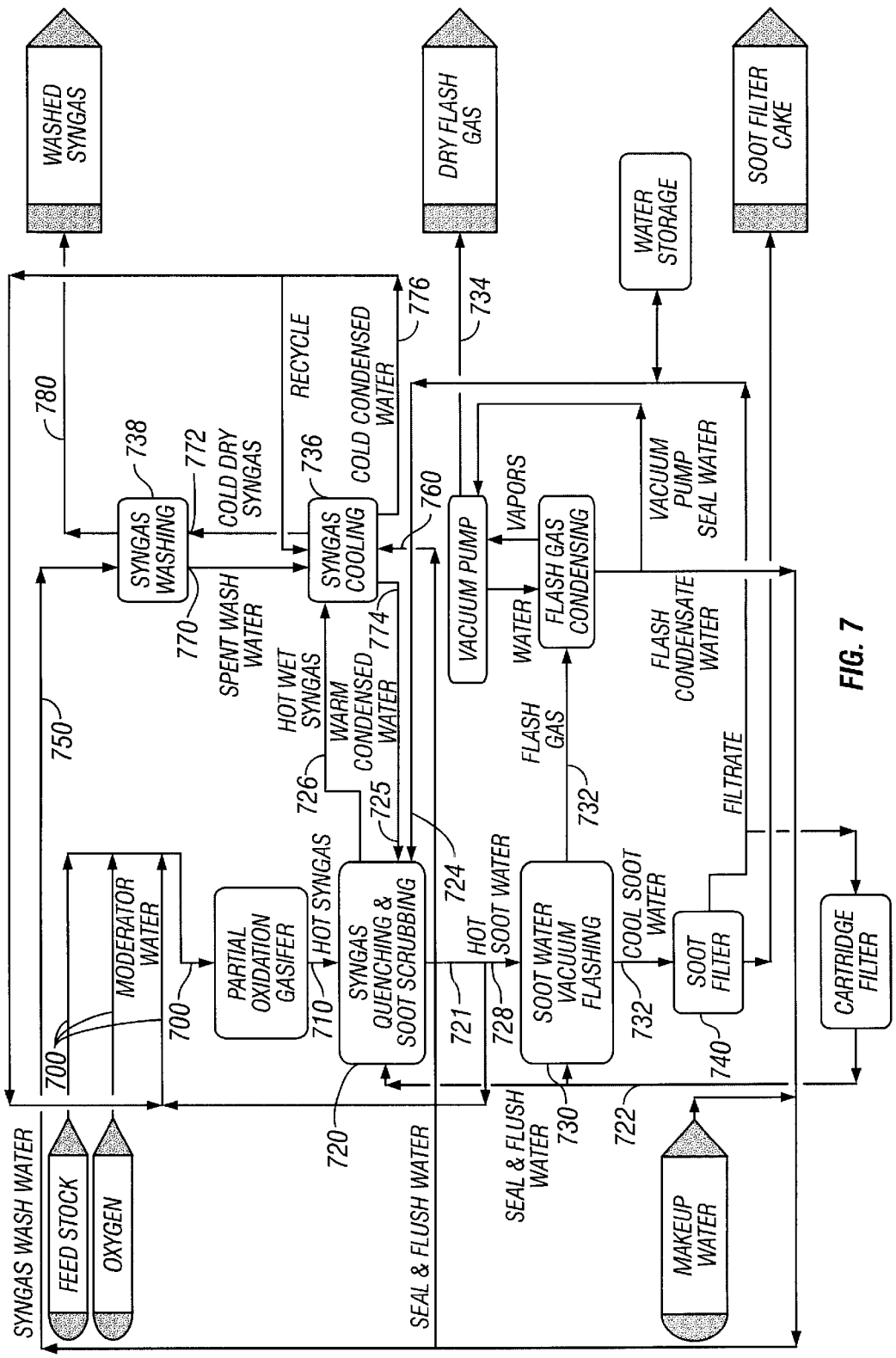
FIG. 7 is a schematic of an alternative method of the present invention.

Referring now to FIG. 7, an alternative method of performing oil gasification in an oil gasification system includes providing feedstock, oxygen and an initial water supply to a partial oxidation gasifier in providing section 700. The partial oxidation gasifier provides hot syngas to a syngas quenching and soot scrubbing section in providing section 710. The hot syngas is then quenched and soot scrubbed in a quenching and soot scrubbing section 720, thereby providing hot soot water to a soot water vacuum flashing section in providing section 728. Hot soot water 721 is also emitted to a soot water vacuum flashing section and to the partial oxidation gasifier from the syngas quenching and soot scrubbing section in the providing section 728. The hot soot water is vacuum flashed in a vacuum flashing section 730, thereby providing flash gas and cool soot water in providing section 732. The flash gas is condensed and subjected to a vacuum thereby extracting vapor to produce water and dry flash gas in an extracting section 734. The hot wet syngas is cooled in a cooling section 736 and washed in a washing section 738 to produce washed syngas. The cool soot water is filtered to produce filtrate and a soot filter cake in a filtering section 740.

The quenching and soot scrubbing section 720 includes a supplying section 722 in which seal and flush water is supplied from a cartridge filter to a syngas quenching and soot scrubbing section. Cool soot water and filtrate is received, from a soot filter, at the syngas quenching and soot scrubbing section in a receiving section 724. Warm condensed water is also received, from a syngas cooling section, at the syngas quenching and soot scrubbing section in a receiving section 725. Hot wet syngas is emitted to the syngas cooling section from the syngas quenching and soot scrubbing section in an emitting section 726. The method of performing oil gasification further includes providing syngas wash water from a condensate water outlet of a flash gas condensing section to a wash water inlet of the syngas washing section in providing section 750. In a providing section 760, seal and flush water is provided to the syngas cooling section. Spent wash water is received from the syngas washing section at a wash water inlet of the syngas cooling section in a receiving section 770. Cold dry syngas is emitted to the syngas washing section from a syngas outlet of the syngas cooling section in an emitting section 772. Warm condensed water and at least a portion of the cold condensed water are emitted to the syngas quenching and soot scrubbing section and the partial oxidation gasifier from a first condensate outlet and a second condensate outlet of the syngas cooling section in receiving sections 774, 776, respectively. Washed syngas is emitted from the syngas washing section in an emitting section 780. It is preferred that the cold condensed water is recycled into an upstream stage of the syngas cooling section 140. Preferably, final syngas cooler knockout drum 450 contains a syngas wash assembly 150.

The syngas processing apparatus and oil gasification system described above are designed to make a low-flow cold condensate water stream with high concentrations of ammonia by recycling most of the cold condensate water back to the upstream syngas cooling stages. In the present invention, this low-flow stream is used as a portion of the moderator water (i.e., makeup water) sent to the gasifier. It has been found that the flow can be low enough that only a small fraction of the soot water normally used as moderator will be displaced. By routing the cold condensate to the gasifier, the ammonia is destroyed (converted to elemental nitrogen) in the gasifier, and an expensive reflux ammonia stripper is not needed.

Making the cold condensate highly concentrated in ammonia also results in relatively high ammonia levels in the cold syngas sent to acid gas removal. Since acid gas removal systems cannot accept much ammonia, the cold syngas is washed with clean water. The wash process includes adding trays 152 to the top of the final syngas cooling section 140 as shown in FIG. 3, with pump 154 to recirculate the wash water to ensure good contact with the syngas. It has been found that a low flow of wash water is adequate to remove all of the excess ammonia from the cold syngas.

At typical levels of feed oil sodium chloride, it has been found that adequate purging of sodium chloride can be accomplished by not washing the soot filter cake, thus allowing the salty water to be purged as filter cake moisture. In order to prevent odors from the filter cake with contaminated water on it, vacuum flashing of the soot water upstream of the filter press results in almost complete removal of odorous hydrogen sulfide from the water. Additional advantages of vacuum flashing are elimination of a cooler (heat exchanger) on the flashed water, normally needed to make the flashed water cool enough to be handled in the soot filter, and elimination of syngas condensate water recycle to the flash to make the pH high enough to avoid corrosion of carbon steel equipment typically used in oil gasification systems.

Vacuum pumps typically used in this service are liquid ring pumps which require water input to maintain the rotating seal. To meet this need, flash condensate water is recycled to the vacuum pump as seal water to eliminate the need to import water for this purpose.

To provide water for seals and flushes and syngas washing without importing water, vacuum flash condensate water is of adequate quality for use in those parts of the system which do not handle water with non-volatile salts (generally, the parts of the system where water is condensed by cooling hot gas). For the parts of the system which handle water which contains non-volatile salts (and thus potentially contain dissolved calcium which could react with carbonate in the flash condensate water and precipitate calcium carbonate scale), the present invention recycles water from the soot filter 270 through a fine-mesh (e.g., 1 micron pore size) cartridge filter 280 for use as seal and flush water (see FIG. 2). Gasification systems normally use a fixed flow of seal and flush water and syngas wash water. This means that excess water is input when the gasification reaction is turned down since the water input is constant. But the water consumption in gasification is halved when the feed rate is halved. By employing process water which is recycled for these uses, the adverse effect of turndown on the water balance is eliminated since fresh water is not imported for this purpose.

With no input of fresh water, the system as described above will normally have a water demand to meet the requirements of the system for making hydrogen in the gasification reactions (typically, gasification of four pounds of feed oil will require one pound of water). This demand enables the use of associated process wastewater (i.e., sulfur recovery tail gas treating water) as makeup water. That stream, derived from combustion of hydrogen sulfide, will typically satisfy about 10% of the water demand. The demand also uses up water generated during maintenance activities such as equipment wash water. The makeup water is also useful to accommodate normal variations that may occur in operating conditions.

To more clearly describe the system, the following example is given. It is to be understood that the details shown below are simplified to describe the primary factors involved in oil gasification. As would be apparent to one of ordinary skill in the art, other secondary factors may affect the process. This example should not represent any limitation on the present invention. Corresponding reference numerals are used where appropriate.

To evaluate the efficacy of the elements of the present invention, the gasification system was modeled as normally done in process design to develop heat and material balances. Using the heat and material balance data, ionic balances were performed. Ionic balances are special material balances which calculate the vapor-liquid distribution of ionizable water-soluble species typically found in gasification systems (e.g., ammonia, carbon dioxide, hydrogen sulfide, formic acid, sodium hydroxide, hydrogen chloride, and hydrogen cyanide) and which also calculate the aqueous ionic chemistry (concentrations of various ions and pH) of these species.

The ionic balances were run using a conventional process on a conventional system that requires costly water treatment devices and an input of additional water to the system. The ionic balances were also run using the process of the present invention. Except for the elements incorporated in this invention, the process conditions for the two cases were identical. The resulting data is presented in Table 1.

TABLE 1

| Factor | Units | Conventional | Present Invention |
|---|---|---|---|
| Ammonia in Cold Syngas | ppmv | 1 | 1 |
| Recycle of Cold Condensate Water to Water Flash | Lb-mole/hr | 100 | 0 |
| Flashed Water Temperature | F | 265 | 153 |
| pH of Flashed Water | pH | 6.6 | 6.5 |
| Sulfide in Flashed Water | ppm | 3.8 | 0.1 |
| Grey Water to Wastewater Treatment | lb-mole/hr | 166 | 0 |
| Grey Water on Soot Filter Cake | lb-mole/hr | 0 | 166 |
| Ammonia Condensate to Sour Water Stripper | lb-mole/hr | 475 | 0 |
| Ammonia Condensate to Gasifier | lb-mole/hr | 0 | 75 |
| Total Makeup Water Requirements | lb-mole/hr | 2105 | 1703 |

In the tests run on both the conventional system and the system of the present invention, conditions were adjusted to keep cold syngas ammonia level below 1 ppmv, the usual standard required by downstream gas handling processes. In the conventional process, high-pH cold syngas condensate water must be recycled to the soot water flash to keep its pH high enough (>6) to not corrode the carbon steel process equipment. It was found in the present invention that this recycle is not needed to maintain high pH. In the conventional process, the flashed water sulfide level was 38 times higher than the limit (0.1 ppm) set to avoid odors in the filter cake obtained from that water, thus requiring that the cake be washed with fresh water before disposal, and also requiring that 166 lb-mole/hr of it be blown down as wastewater as a means for purging inert salts (sodium chloride). In the method of the present invention, the flashed water meets the sulfide limit, which allows keeping the process water on the filter cake and thus achieving an inert salt purge without generating a wastewater stream. In the conventional process, 475 lb-mole/hr of cold syngas condensate water must be purged to keep cold syngas ammonia levels within specification, and the purged water must be steam stripped in a sour water stripper, with attendant need for stripping steam and for stripper offgas (ammonia, carbon dioxide, and hydrogen sulfide) handling. In the process of the present invention, this flow is reduced to 75 lb-mole/hr, which is low enough to enable using it untreated as moderator water in the gasifier. While the main advantage of this invention is elimination of two wastewater streams which are very expensive to treat, it also achieves reduction of intake water usage (402 lb-mole/hr reduction in this example, from 2105 to 1703), which is extremely advantageous.

Figure 8:
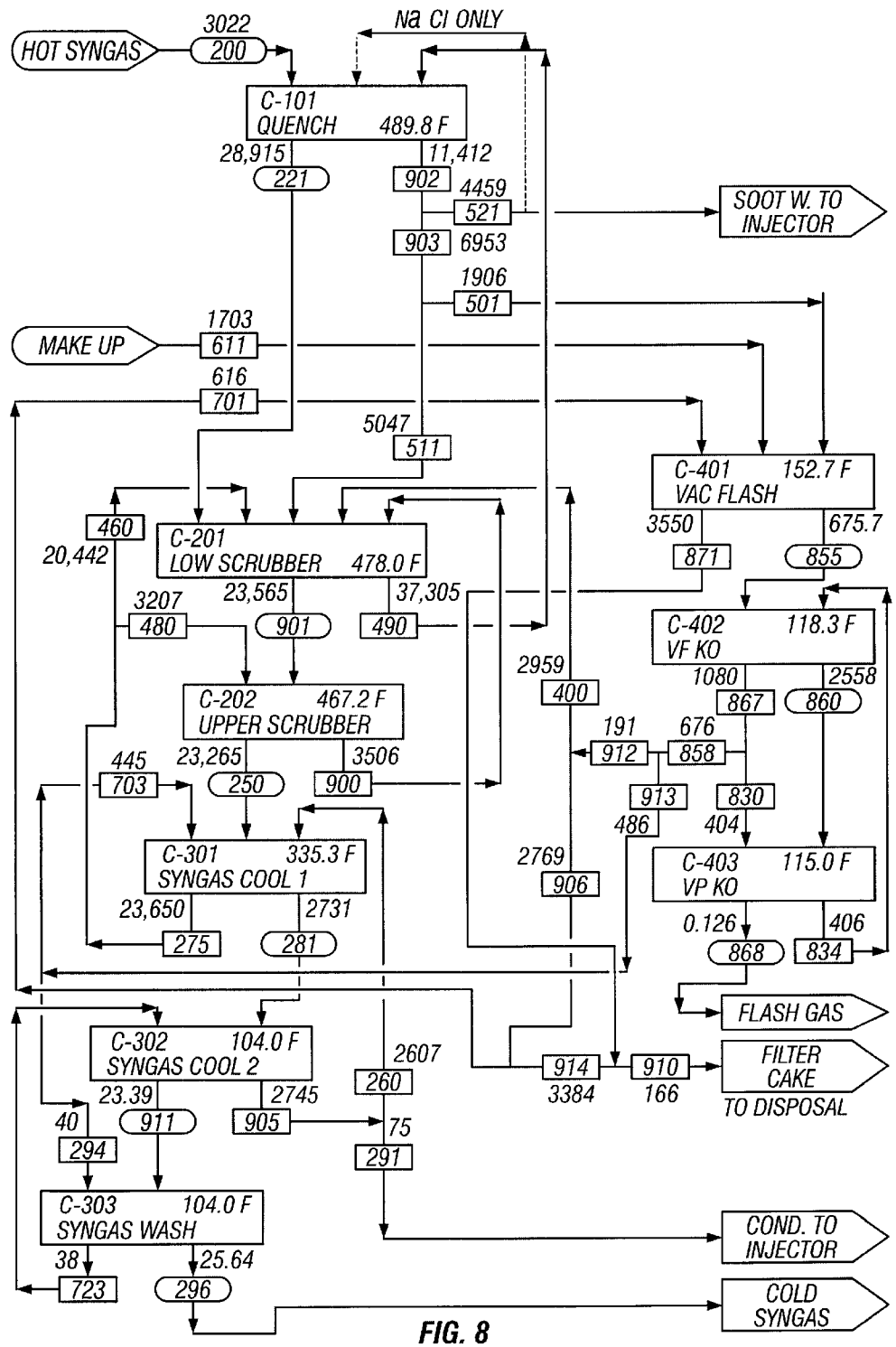
FIG. 8 is a flow schematic of results obtained using the system of the present invention.

The ionic balances referred to above are outlined in detail in the following tables with reference to FIG. 8. The numerals in the boxes in FIG. 8 represent stream numbers at designated points in the system at which measurements were taken. The relevant reference points are described in each table below. The numbers outside the boxes in the figure represent flow rates of the relevant streams measured in lb-mole/hr. Table 3 provides data for the Hot Syngas and makeup water feed streams. Table 3 provides data for the vapor streams. Table 4 (Parts A–E) provides data for the liquid streams.

TABLE 2

| Feed Streams | | | |
|---|---|---|---|
| Stream Number | | 200 | 611 |
| Lb-mole/hr | $NH_3$ | 9.44 | 0 |
| | $CO_2$ | 1934.63 | 0 |
| | $H_2S$ | 204.69 | 0 |
| | HCOOH | 5.1 | 0 |
| | NaOH | 0.13 | 0 |
| | HCl | 0.13 | 0 |
| | HCN | 0.49 | 0 |
| | $H_2O$ | 3022.02 | 1703.77 |

200 = Hot Syngas
611 = Makeup water

TABLE 3

| Vapor Streams | | | | | | | | | |
|---|---|---|---|---|---|---|---|---|---|
| Stream No. | 221 | 901 | 250 | 281 | 911 | 296 | 855 | 860 | 868 |
| Lb mole/hr | | | | | | | | | |
| $NH_3$ | 32.63 | 164.37 | 185.78 | 151.20 | 0.23 | 0.01 | 0.07 | 0.00 | 0.00 |
| $CO_2$ | 1943.53 | 1972.0 | 1976.9 | 2075.1 | 1929.17 | 1928.88 | 0.54 | 0.55 | 0.49 |
| $H_2S$ | 207.34 | 229.57 | 233.09 | 213.47 | 204.07 | 204.03 | 0.13 | 0.14 | 0.10 |
| HCOOH | 0.00 | 0.00 | 0.00 | 0.00 | 0.00 | 0.00 | 0.00 | 0.00 | 0.00 |
| NaOH | 0.00 | 0.00 | 0.00 | 0.00 | 0.00 | 0.00 | 0.00 | 0.00 | 0.00 |
| HCl | 0.00 | 0.00 | 0.00 | 0.00 | 0.00 | 0.00 | 0.00 | 0.00 | 0.00 |
| HCN | 0.53 | 0.89 | 0.95 | 0.92 | 0.48 | 0.48 | 0.00 | 0.00 | 0.00 |
| $H_2O$ | 28915.2 | 23564.5 | 23265.1 | 2730.6 | 23.39 | 25.64 | 675.72 | 2.56 | 0.13 |
| Psia | | | | | | | | | |
| $NH_3$ | 0.69659 | 3.86582 | 3.99251 | 6.06920 | 0.00936 | 0.00037 | 0.00042 | 0.00010 | 0.00001 |
| $CO_2$ | 41.48761 | 46.37874 | 42.48338 | 83.29596 | 79.32168 | 79.27911 | 0.00317 | 0.34562 | 5.66813 |
| $H_2S$ | 4.42605 | 5.39909 | 5.00909 | 8.56869 | 8.39099 | 8.38600 | 0.00075 | 0.08593 | 1.20958 |
| HCOOH | 0.00000 | 0.00000 | 0.00000 | 0.00000 | 0.00000 | 0.00000 | 0.00000 | 0.00000 | 0.00000 |
| NaOH | 0.00000 | 0.00000 | 0.00000 | 0.00000 | 0.00000 | 0.00000 | 0.00000 | 0.00000 | 0.00000 |
| HCl | 0.00000 | 0.00000 | 0.00000 | 0.00000 | 0.00000 | 0.00000 | 0.00000 | 0.00000 | 0.00000 |

TABLE 3-continued

Vapor Streams

| Stream No. | 221 | 901 | 250 | 281 | 911 | 296 | 855 | 860 | 868 |
|---|---|---|---|---|---|---|---|---|---|
| HCN | 0.01125 | 0.02103 | 0.02044 | 0.03697 | 0.01977 | 0.01955 | 0.00001 | 0.00023 | 0.00039 |
| H₂O | 617.25395 | 554.20423 | 499.9732 | 109.61150 | 0.96187 | 1.05368 | 3.96410 | 1.61427 | 1.47055 |
| Temp (F) | 489.8 | 478 | 467.2 | 335.3 | 104 | 104 | 152.7 | 118.3 | 115 |
| Vol Flow MCFH | 477.34 | 427.88 | 462.87 | 212.54 | 147.12 | 147.18 | 1120.27 | 9.83 | 0.53 |

221 = O.H. Quench
901 = O.H. Lower Scrubber
250 = O.H. Upper Scrubber
281 = O.H. Syngas Cool 1
911 = O.H. Syngas Cool 2
296 = O.H. Syngas Wash
855 = O.H. Vacuum Flash
860 = O.H. Vacuum Flash Knock Out
868 = O.H. Vacuum Pump Knock Out

TABLE 4

Liquid Streams
Part A

| Stream Number | 902 | 521 | 903 | 501 | 511 | 490 |
|---|---|---|---|---|---|---|
| LbMole/Hr | | | | | | |
| NH₃ | 13.25 | 5.18 | 8.08 | 2.21 | 5.86 | 36.45 |
| CO₂ | 3.24 | 1.27 | 1.97 | 0.54 | 1.43 | 12.14 |
| H₂S | 0.77 | 0.30 | 0.47 | 0.13 | 0.34 | 3.42 |
| HCOOH | 12.74 | 4.98 | 7.76 | 2.13 | 5.64 | 7.64 |
| NaOH | 13.76 | 5.38 | 8.38 | 2.30 | 6.08 | 8.25 |
| HCl | 13.76 | 5.38 | 8.38 | 2.30 | 6.08 | 8.25 |
| HCN | 0.01 | 0.00 | 0.00 | 0.00 | 0.00 | 0.04 |
| H₂O | 11411.99 | 4459.03 | 69532.97 | 1906.01 | 5046.96 | 37305.22 |
| ppm | | | | | | |
| NH₃ | 1087.2 | 1087.2 | 1087.2 | 1087.2 | 1087.2 | 920.5 |
| CO₂ | 686.7 | 686.7 | 686.7 | 686.7 | 686.7 | 792.4 |
| H₂S | 126.3 | 126.3 | 126.3 | 126.3 | 126.3 | 172.7 |
| HCOOH | 2825.1 | 2825.1 | 2825.1 | 2825.1 | 2825.1 | 521.8 |
| NaOH | 2650.3 | 2650.3 | 2650.3 | 2650.3 | 2650.3 | 489.5 |
| HCl | 2416.1 | 2416.1 | 2416.1 | 2416.1 | 2416.1 | 446.2 |
| HCN | 0.7 | 0.7 | 0.7 | 0.7 | 0.7 | 1.6 |
| H₂O | 990209.1 | 990209.1 | 990209.1 | 990209.1 | 990209.1 | 996655.4 |
| Temp. F | 489.8 | 489.8 | 489.8 | 489.8 | 489.8 | 478 |
| pH | 4.87 | 4.87 | 4.87 | 4.87 | 4.87 | 6.43 |
| Ca Sol'y ppm | 30000 | 300000 | 30000 | 30000 | 30000 | 20341 |

902 = Bott-Quench
521 = Soot Water to Injector
903 = Soot Water to Process
501 = Soot Water to Flash
511 = Soot Water to Scrub
490 = Bott-Lower Scrubber

Part C

| Stream Number | 291 | 723 | 871 | 867 | 858 | 830 |
|---|---|---|---|---|---|---|
| LbMole/Hr | | | | | | |
| NH₃ | 4.13 | 0.22 | 2.59 | 0.11 | 0.07 | 0.04 |
| CO₂ | 4.00 | 0.30 | 0.00 | 0.09 | 0.06 | 0.03 |
| H₂S | 0.26 | 0.04 | 0.00 | 0.04 | 0.02 | 0.01 |
| HCOOH | 0.00 | 0.00 | 2.58 | 0.00 | 0.00 | 0.00 |
| NaOH | 0.00 | 0.00 | 2.78 | 0.00 | 0.00 | 0.00 |

-continued

Part C

| Stream Number | 291 | 723 | 871 | 867 | 858 | 830 |
|---|---|---|---|---|---|---|
| HCl | 0.00 | 0.00 | 2.78 | 0.00 | 0.00 | 0.00 |
| HCN | 0.001 | 0.01 | 0.00 | 0.00 | 0.00 | 0.00 |
| $H_2O$ | 75.00 | 37.76 | 3550.06 | 1079.60 | 675.60 | 404.00 |
| ppm | | | | | | |
| $NH_3$ | 43796.3 | 5433.5 | 686.2 | 100.1 | 100.1 | 100.1 |
| $CO_2$ | 109478.2 | 18726.4 | 0.3 | 199.8 | 199.8 | 199.8 |
| $H_2S$ | 5471.0 | 2167.9 | 0.1 | 69.1 | 69.1 | 69.1 |
| HCOOH | 0.0 | 0.0 | 1842.6 | 0.0 | 0.0 | 0.0 |
| NaOH | 0.0 | 0.0 | 1728.6 | 0.0 | 0.0 | 0.0 |
| HCl | 0.0 | 0.0 | 1575.8 | 0.0 | 0.0 | 0.0 |
| HCN | 197.1 | 193.0 | 0.0 | .8 | .8 | .8 |
| $H_2O$ | 841099.9 | 973535.6 | 994166.4 | 999629.3 | 999629.3 | 999629.3 |
| Temp. F | 104 | 104 | 152.7 | 118.3 | 118.3 | 118.3 |
| pH | 7.06 | 6.66 | 6.51 | 7.51 | 7.51 | 7.51 |
| CaSol'y ppm | 0 | 55 | 30000 | 57 | 57 | 57 |

291 = Cold Condensate to Inject
723 = Bott-Syngas Wash
871 = Bott-Vacuum Flash
867 = Bott-Vacuum Flash
858 = Vacuum Flash Condensate to Process
530 = Vacuum Flash Condensate to Vacuum Pump The embodiment of the invention shown in FIG. 8 includes a quencher C-101, a lower scrubber C-201, an upper scrubber C-202, a first syngas cooler C-301, a second syngas cooler C-302, a syngas washer C-303, a vacuum flasher C-401, a vacuum flash knockout section C-402, and a vacuum pump knockout section C-403.

As described above, and as shown in the above example, the present invention provides a system and method for oil gasification. It should be apparent that the present invention may be used to increase efficiency, to lower equipment costs and operating costs, while achieving more desirable results.

Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

We claim:

1. A method for providing seal and flush water to an oil gasification system, comprising:

receiving hot soot water from a syngas quencher and soot scrubber at a soot water vacuum flasher, receiving cool soot water from the soot water vacuum flasher at a soot filter, receiving filtrate water from the soot filter at a cartridge filter, providing seal and flush water to the soot water vacuum flasher and the syngas quencher and soot scrubber from the cartridge filter, providing filtrate water to a water storage tank and the syngas quencher and soot scrubber from the soot filter, receiving flash gas from the soot water vacuum flasher at a flash gas condenser, providing flash condensate water from the flash gas condenser to a vacuum pump as seal water, to a syngas cooler as seal and flush water, and to a syngas washer as syngas wash water.

2. The method of claim 1, wherein the vacuum pump is coupled to the flash gas condenser.

3. The method of claim 2, wherein the vacuum pump extracts vapors from the flash gas condenser and emits water to a flash gas condenser knockout drum and emits dry flash gas.

4. The method of claim 2, wherein the vacuum pump is a liquid ring pump.

5. The method of claim 1, wherein the cartridge filter is a fine mesh filter.

6. The method of claim 1, wherein the oil gasification system is a substantially closed-loop system.

* * * * *